(12) United States Patent
Beattie et al.

(10) Patent No.: US 10,969,008 B2
(45) Date of Patent: Apr. 6, 2021

(54) TRANSMISSION SHIFTER ASSEMBLY WITH AUTOMATIC POSITION RESET

(71) Applicant: Dura Operating, LLC, Auburn Hills, MI (US)

(72) Inventors: Dale A. Beattie, Norton Shores, MI (US); Joseph D. Jiran, Fremont, MI (US)

(73) Assignee: DUS OPERATING INC., Auburn Hills, MI (US)

( * ) Notice: Subject to any disclaimer, the term of this patent is extended or adjusted under 35 U.S.C. 154(b) by 68 days.

(21) Appl. No.: 16/233,409

(22) Filed: Dec. 27, 2018

(65) Prior Publication Data

US 2019/0203830 A1 Jul. 4, 2019

Related U.S. Application Data

(60) Provisional application No. 62/611,027, filed on Dec. 28, 2017.

(51) Int. Cl.
| | |
|---|---|
| *F16H 61/22* | (2006.01) |
| *F16H 59/02* | (2006.01) |
| *F16H 59/08* | (2006.01) |
| *F16H 61/24* | (2006.01) |

(52) U.S. Cl.
CPC ............ *F16H 61/22* (2013.01); *F16H 59/08* (2013.01); *F16H 61/24* (2013.01); *F16H 2059/0295* (2013.01); *F16H 2059/081* (2013.01); *F16H 2061/247* (2013.01)

(58) Field of Classification Search
CPC ....... F16H 2059/0295; F16H 2059/081; F16H 61/22; F16H 2061/223; G05G 1/10; G05G 5/005; G05G 5/02; G05G 5/04; G05G 5/05
See application file for complete search history.

(56) References Cited

U.S. PATENT DOCUMENTS

| | | | | |
|---|---|---|---|---|
| 7,571,662 | B2 * | 8/2009 | Pickering | B60K 37/06 74/473.3 |
| 7,971,498 | B2 * | 7/2011 | Meyer | F16H 59/08 74/10.41 |
| 9,212,740 | B2 | 12/2015 | Watanabe et al. | |
| 9,334,949 | B2 | 5/2016 | Fett et al. | |
| 9,620,309 | B2 | 4/2017 | Hoskins et al. | |
| 9,845,868 | B2 * | 12/2017 | Lee | F16H 59/08 |

(Continued)

FOREIGN PATENT DOCUMENTS

| | | |
|---|---|---|
| SU | 258797 A1 | 12/1969 |
| WO | WO2013123375 A2 | 8/2013 |
| WO | WO2015088630 A1 | 6/2015 |

*Primary Examiner* — Bobby Rushing, Jr.
(74) *Attorney, Agent, or Firm* — Vivacqua Crane

(57) ABSTRACT

At least some implementations of a transmission gear shifter include a first body rotatable among multiple positions, a second body rotatable among multiple positions, a retainer and first and second actuators. The retainer is movable relative to the second body between a first position in which the retainer prevents rotation of the second body, and a second position in which the retainer permits rotation of the second body. The first actuator is coupled to the retainer to move the retainer between the first and second positions. And the second actuator provides a force on the second body to rotate the second body when the retainer is in the second position.

16 Claims, 15 Drawing Sheets

(56) References Cited

U.S. PATENT DOCUMENTS

| | | |
|---|---|---|
| 2007/0261509 A1 | 11/2007 | Meyer et al. |
| 2013/0313086 A1 | 11/2013 | Redwood et al. |
| 2015/0285351 A1 | 10/2015 | Rake et al. |
| 2016/0138704 A1 | 5/2016 | Watanabe et al. |
| 2016/0312882 A1 | 10/2016 | Heo et al. |
| 2017/0074391 A1* | 3/2017 | Tebbe .................... F16H 59/08 |
| 2018/0363775 A1* | 12/2018 | Watanabe ............... F16H 59/08 |

* cited by examiner

TRANSMISSION SHIFTER ASSEMBLY WITH AUTOMATIC POSITION RESET

REFERENCE TO CO-PENDING APPLICATIONS

This application claims the benefit of U.S. Provisional Patent Application Ser. No. 62/611,027 filed Dec. 28, 2017, which is incorporated herein by reference in its entirety.

TECHNICAL FIELD

The present disclosure relates generally to a gear shift system for a vehicle transmission.

BACKGROUND

In some vehicles, a gear shift lever in a passenger compartment of the vehicle can be moved by an operator of the vehicle to shift the vehicle transmission between its park gear and other gears, such as reverse, neutral and forward drive gears. The shift lever is mechanically coupled to the transmission through a cable that transmits the shift lever movement to a transmission shift mechanism. Other vehicles use a so-called "shift-by-wire" system wherein an operator shift lever or shift control unit is not physically coupled to the transmission shift mechanism by a cable. Instead, the shift control unit is electrically coupled to a shift actuator that is arranged to shift the transmission upon receipt of a signal from the shift control unit that a transmission gear shift is desired by the operator. It may be desirable, in at least some circumstances, to selectively prevent movement of the shift lever to prevent shifting the transmission at least until certain conditions are satisfied. For example, to shift the transmission out of park, a vehicle brake may need to be depressed or some other driver action may be needed. In some instances, it may be desirable to shift the transmission without a user command to do so.

SUMMARY

At least some implementations of a transmission gear shifter include a first body rotatable among multiple positions, a second body rotatable among multiple positions, a retainer and first and second actuators. The retainer is movable relative to the second body between a first position in which the retainer prevents rotation of the second body, and a second position in which the retainer permits rotation of the second body. The first actuator is coupled to the retainer to move the retainer between the first and second positions. And the second actuator provides a force on the second body to rotate the second body when the retainer is in the second position.

In at least some implementations, the second actuator is a biasing member having a first part engaged with the first body and a second part engaged with the second body so that rotation of the first body relative to the second body in one direction increases a force of the biasing member. One of the first body and the second body may include a void and the other of the first body and the second body may include a projection received within the void, and the biasing member may be received within the void and is engaged by the projection.

In at least some implementations, the retainer is movable relative to the first body and when the retainer is in the second position, the retainer prevents rotation of the first body. The retainer may be movable to a third position wherein the retainer prevents rotation of both the first body and the second body.

In at least some implementations, the shifter also includes a retainer associated with and selectively engageable with the first body to selectively prevent rotation of the first body and wherein the first actuator drives both the retainer associated with the first body and the retainer that prevents rotation of the second body. The retainer associated with the first body may be driven by the first actuator and the retainer that prevents rotation of the second body may be driven by the retainer associated with the first body. A lost motion coupling may be provided between the retainer that prevents rotation of the second body and the retainer associated with the first body.

In at least some implementations, the shifter also includes feedback surfaces and a follower engaged with the feedback surfaces, wherein one of the feedback surfaces or the follower is carried by the first body to provide a variable resistance to rotation of the first body. In at least some implementations, one of the first body and the second body includes a void and the other of the first body and the second body includes a projection received within the void, and wherein relative rotation between the first body and the second body is limited in at least one direction by engagement of the projection with the body that defines the void.

In at least some implementations, a shifter for a vehicle transmission, includes a selector rotatable among multiple positions to shift the transmission, the selector includes a first body, a second body rotatable among multiple positions and rotatable relative to the first body, the second body having multiple control features, a retainer being movable relative to the second body between a first position and a second position, the retainer including a control feature that interacts with at least one control feature of the second body so that, when the retainer is in the first position, rotation of the second body is prevented, and when the retainer is in the first position the second body may rotate, a first actuator coupled to the retainer to move the retainer between the first and second positions, and a second actuator providing a force on the second body to rotate the second body when the retainer is in the second position.

In at least some implementations, the second actuator is a biasing member having a first part engaged with the first body and a second part engaged with the second body so that rotation of the first body relative to the second body in one direction increases a force of the biasing member. One of the first body and the second body may include a void and the other of the first body and the second body may include a projection received within the void, and wherein the biasing member is received within the void and is engaged by the projection.

In at least some implementations, the retainer is selectively engageable with the first body and when the retainer is in the second position, the retainer prevents rotation of the first body. The retainer may be movable to a third position wherein the retainer prevents rotation of both the first body and the second body. The first body may include multiple voids, the second body may include multiple voids and the retainer when in the third position may be received at least partially in one of the voids of the first body and one of the voids of the second body.

BRIEF DESCRIPTION OF THE DRAWINGS

The following detailed description of some implementations of a shifter will be set forth with regard to the accompanying drawings, in which.

DETAILED DESCRIPTION

Figure 1:
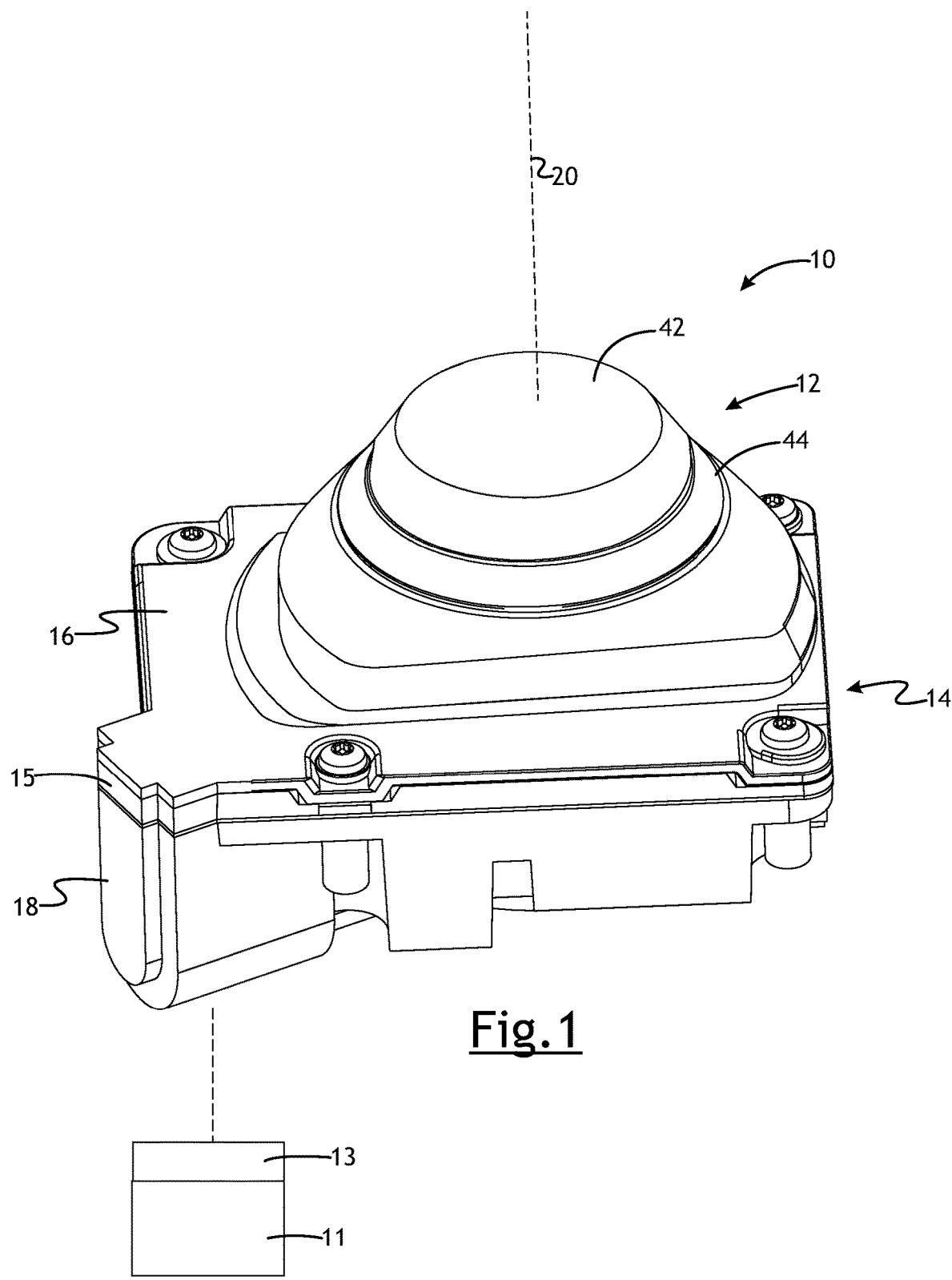
FIG. 1 is a top perspective view of a transmission gear shifter assembly with a rotary selector.
Figure 2:
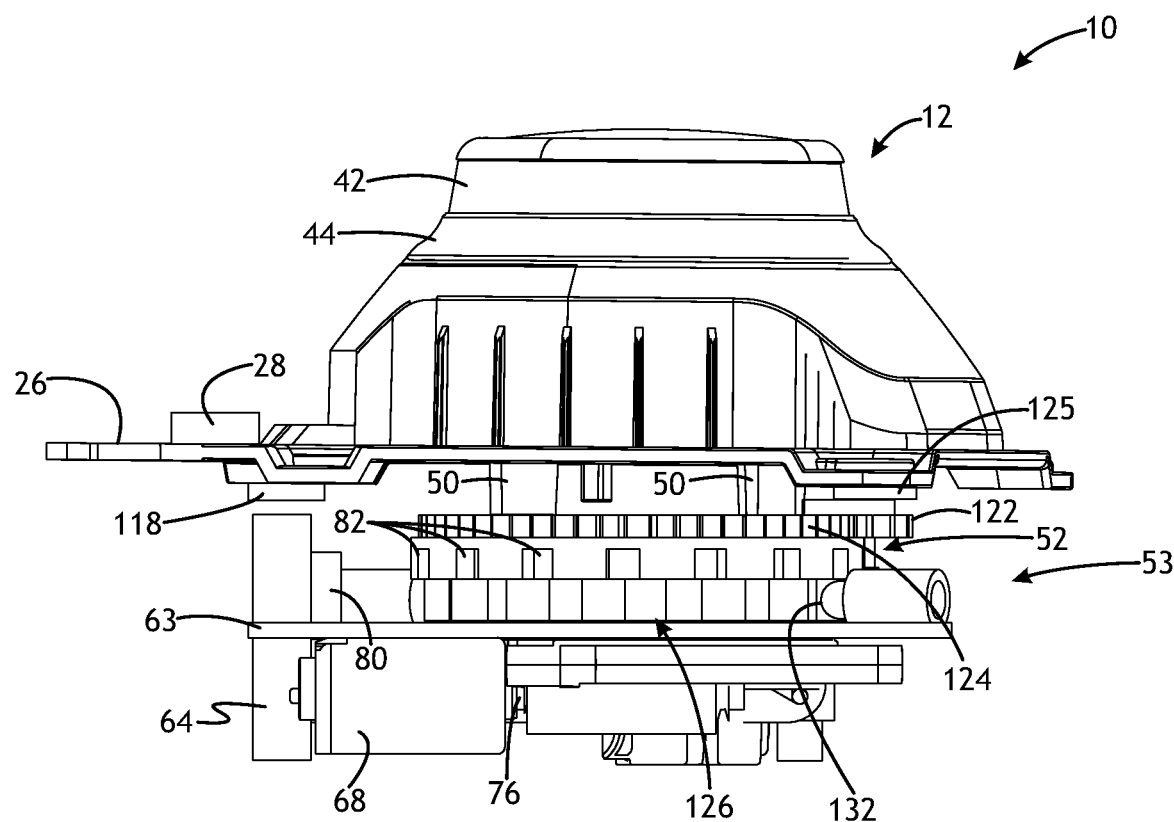
FIG. 2 is a side view of the shifter of FIG. 1 with a housing and some other components removed to show certain internal components including the selector, a circuit board, and a retainer and actuator assembly.

Referring in more detail to the drawings, FIGS. 1 and 2 illustrate a rotary gear shifter 10 that may be used to shift among various gears of a transmission 11. In at least some implementations, the shifter 10 is not directly mechanically coupled to the transmission 11 and instead communicates electrically with an actuator 13 coupled to the transmission 11 that, in turn, causes a change in the selected transmission gear in a so-called shift-by-wire system. The shifter 10 may include a first shift member, such as a dial, knob or other rotary selector 12, that may be manually rotated by a user through multiple positions corresponding to multiple gears of the vehicle transmission. By way of non-limiting examples, the selector 12 may include and be rotated to one or more positions that correspond to park, reverse, neutral and drive gears of the vehicle transmission 11.

The selector 12 may be mounted to a housing 14 (only part of which is shown to better illustrate internal components) that is arranged to be mounted within a vehicle. The housing 14 may have an upper portion 15, a cover 16 (FIGS. 1 and 2) over the upper portion and surrounding the selector 12 and a base 18 coupled to the upper portion 15 and/or cover to define an at least partial enclosure for the selector 12 and related shifter components, as set forth below. The selector 12 may be carried by the housing 14 for rotation relative to the housing about a central axis 20. And so that the selector may be manually actuated by a user to cause a transmission gear change, the selector 12 may extend at least partially out of the cover 16.

As shown in FIG. 2, within the enclosure, the shifter 10 may include a circuit board 26 on which one or more circuit elements, such as a microprocessor or controller 28, may be mounted. In at least some implementations, the circuit board 26 is generally planar and is mounted perpendicularly to the axis 20 of rotation of the selector 12. If desired, a gasket or other seals may be provided between the cover 16 and the circuit board 26. For example, a gasket may be provided between the flange 24 of the cover 16 and the circuit board 26. The gasket and/or other seals may help to isolate the circuit elements on the circuit board 26 from liquids and other contaminants, if desired.

Figure 4:
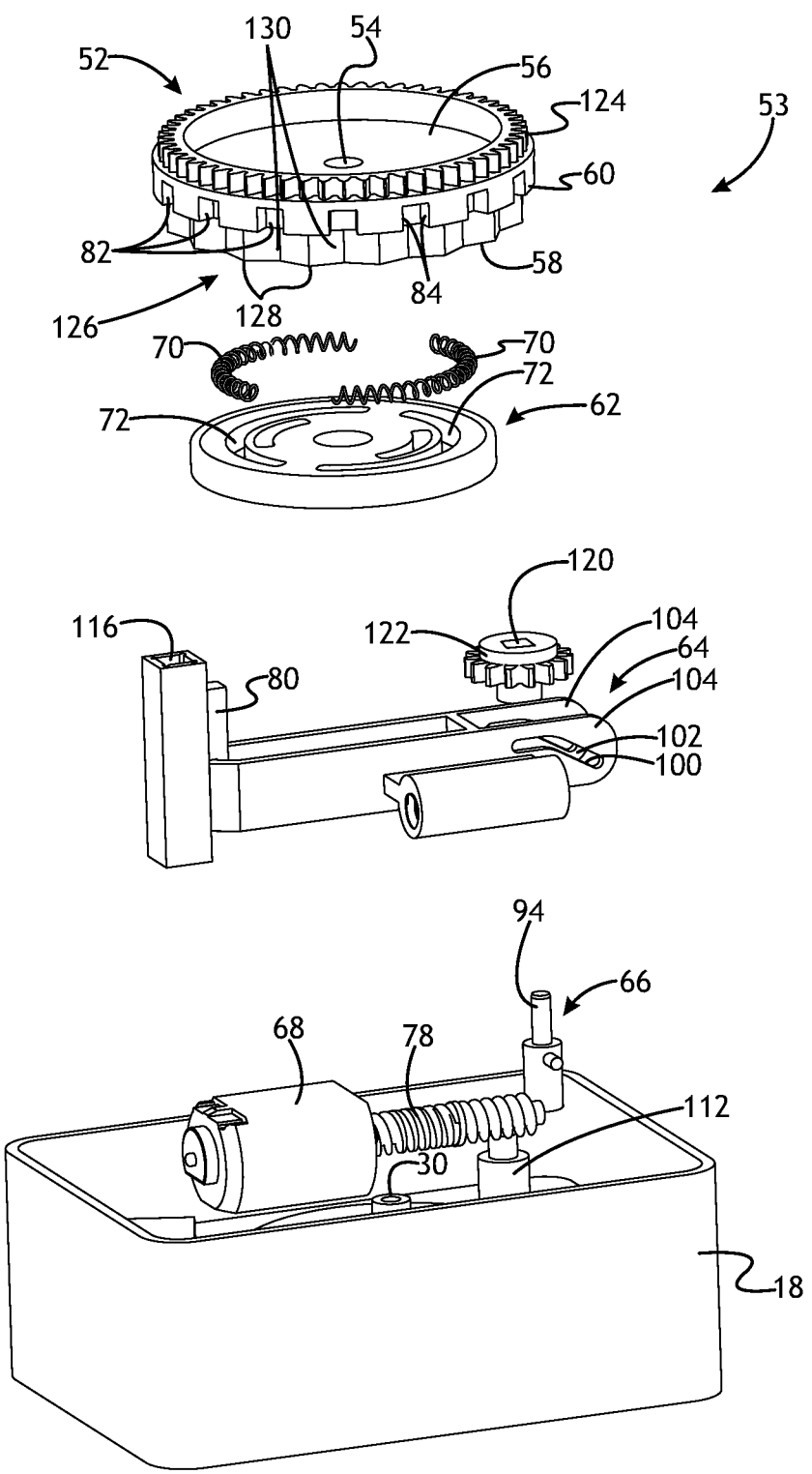
FIG. 4 is an exploded perspective view of the retainer and actuator assembly.

The housing base 18, or at least a portion thereof, is shown in FIGS. 1 and 4 among others. The base 18 may include a post 30 (FIGS. 7-10) about which part of the selector 12 is received and which may help guide the rotation of the selector 12, and other features to mount or interact with various components within the housing 14, as will be discussed below.

As shown in FIGS. 1 and 2, the selector 12 may include a user actuated knob 42 that may include or be coupled to a decorative cover 44 that is fixed to the knob for co-rotation with the knob. Referring to FIG. 2, the knob 42 may include one or more legs 50 that extend toward and are coupled to a first body 52 of a retainer and actuator assembly 53, so that the knob 42 and first body 52 rotate together. This provides some space between the knob 42 and first body 52 in which components like buttons, LED lights, switches and the like may be received, if desired.

The first body 52 may be fixed to the legs 50 or some other portion of the knob 42 for co-rotation with the knob. The first body 52 may be mounted to the housing 14, such as by the post 30 that extends into or through a central opening 54 (FIGS. 4 and 7) in the first body 52 so that the first body (and connected knob) rotate relative to the post and housing. In the example shown, the first body 52 is generally disc-shaped, with an upper face 56 facing the knob 42, a lower face 58 that faces in the opposite direction (e.g. toward the base 18 of the housing 14) and an axially and circumferentially extending sidewall 60 at the radial outer surface of the first body 52.

Further, the circuit board 26 may extend between the knob 42 and the first body 52 of the selector 12, with the legs 50 extending through holes in the circuit board, or located outboard (e.g. adjacent to side edges) of the circuit board. A portion of the upper housing 16 may also extend between the knob 42 and first body 52 of the selector 12 to facilitate rotary mounting of the selector. In addition to or instead of these things, the electronic controller 28, which may include a microprocessor, could be received within the knob 42 or elsewhere, as desired. Among other things, the controller 28 may be used to manage the operation of the shifter 10 including any buttons, lights or other features provided with the shifter, if desired. With portions of the selector 12 on either side of the circuit board 26, various electronic components may be located in close proximity to different portions of the selector to facilitate electrical coupling of the components to the circuit board 26 and controller 28.

The actuator and retainer assembly 53 may include the first body 52, a second body 62, an intermediate plate or flange 63 of the housing 14, first and second retainers 64, 66 and at least one actuator 68 that moves the retainers 64, 66 relative to the first and second bodies 52, 62. The flange 63 may include the post 30 about which the first body 52 rotates as the selector 12 is moved among its positions. The second body 62 may also be received and rotate about the post 30 (and axis 20), and the first and second bodies 52, 62 may rotate relative to each other to provide various positions of the selector 12, as set forth in more detail below. In at least some implementations, rotation of the first body 52 is selectively prevented by the first retainer 64 and rotation of the second body 62 is selectively prevented by the second retainer 66. Of course, other arrangements may be used.

In at least some implementations, to receive and actuate a biasing member 70, one of the first and second bodies 52, 62 includes a void 72 and the other of the bodies includes a projection 74 received at least partially within the void. Rotation of one of the bodies 52, 62 relative to the other causes relative motion between the void 72 and projection 74. The biasing member 70 may be increasingly compressed or loaded by relative rotation between the first and second bodies 52, 62 in one direction to increase the force of the spring on the bodies 52, 62, and the biasing member 70 may be decompressed or unloaded by relative rotation between the bodies in the other direction.

In the example shown, the first body 52 includes two pegs 74 that define the projection(s) and extend axially from the lower face 58 of the first body 52, and the second body 62 includes two arcuate slots 72 that define the void(s) and are formed in an upper face of the first body 52. The slots 72 may extend circumferentially a desired distance about the axis 20, the slots may be diametrically opposed (e.g. to provide balanced forces between the bodies), and each slot may be at a certain radial distance and arranged to receive one of the pegs 74. Relative rotation between the first body 52 and the second body 62 is limited in at least one direction by engagement of the pegs 74 with the second body 62, within the slots 72 (e.g. by engagement with an end of the slot). At least one biasing member 70 may be provided in each slot 72, and the two biasing members 70 in the illustrated example are coil springs that have a first end engaged with the second body 62 (e.g. at an end of the slot 72 in which each spring 70 is received) and a second end engaged with a peg 74 of the first body 52. Of course, other arrangements can be used. For example, a torsion spring could have one end fixed to the first body 52 and another end fixed to the second body 62 to provide a biasing force on the bodies, an actuator such as a motor or linear actuator could be used to drive one body relative to the other, among other possibilities. In addition or instead of the slots 72 and pegs 74 limiting rotation of the selector 12, stops separate from the pegs 74 and slots 72 may be included with the bodies 52, 62. In the example shown, the second body 62 includes one or more stop slots 75 in which stop pegs 77 of the first body 52 are received. The stop slots 75 may be radially offset from the slots 72 and the stop pegs 77 may engage or be adjacent to the opposed ends of the stop slots 75 at the rotational limit of the selector in either direction.

Figure 3:
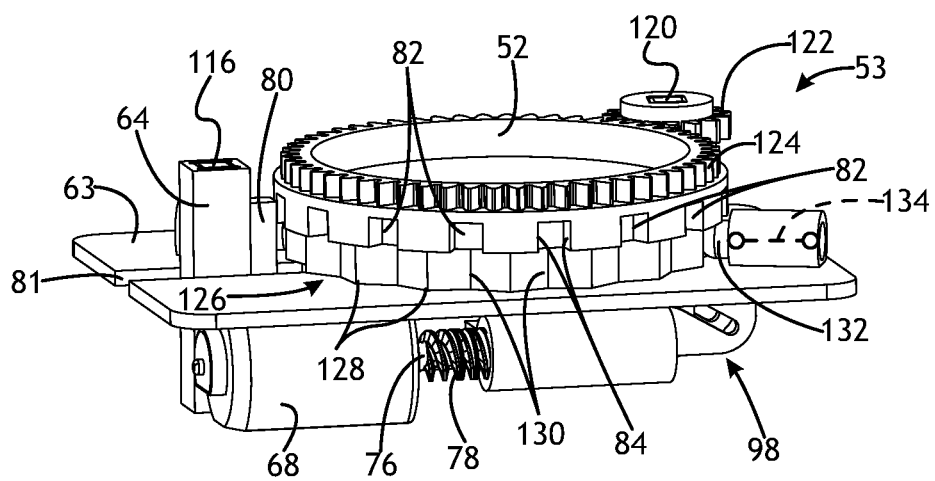
FIG. 3 is a top perspective view of the retainer and actuator assembly.

As noted above, rotation of the first and second bodies 52, 62 may be prevented by the retainers 64, 66. To drive one or both of the first retainer 64 and the second retainer 66 relative to the first and second bodies 52, 62, the actuator 68 may be coupled to one or both of the retainers. In at least some implementations, the actuator 68 may be any desired form of rotary or linear actuator suitable to move the first retainer 64 relative to the first body 52 as set forth below. In the example shown, the actuator 68 is a reversible electric motor 68 with a rotary drive shaft 76 (FIGS. 2 and 3). The drive shaft 76 is coupled to a drive member 78 that is coupled to and drives the retainer 64. In the example shown, the drive member is a cylindrical spindle 78 that has one or more outwardly extending threads that mate with internal thread(s) in a bore of the first retainer 64 to linearly drive the first retainer relative to the actuator 68 and the first body 52. When the drive shaft 76 and spindle 78 are rotated in a first direction the retainer 64 is moved in a first direction, and when the drive shaft 76 and spindle 78 are rotated in a second direction the retainer 64 is moved in a second direction. The motor 68 may be controlled and actuated by the controller 28 on the circuit board 26 or by a different vehicle controller, as desired. While described with regard to linear motion, the retainer 64 could instead be rotated by the actuator, or moved along a path of some other shape, as desired. In the implementation shown, the actuator 68 is received on the opposite side of the flange as the first and second bodies, although other arrangements may be used.

The first retainer may include a blocking member 80 that is selectively engaged with or moved in the path of rotation of the first body 52 to selectively prevent rotation of the first body 52. The portion of the first retainer that is coupled to the spindle may be on the opposite side of the flange 63 as the first body 52, and the blocking member 80 may extend through a slot 81 in the flange 63 or be received outboard of the flange and is moved toward and away from the first body 52 as set forth in more detail below. The slot 81 may help guide the linear movement of the first retainer 64, although other guide surfaces or other points of connection of the first retainer, such as between the first retainer 64 and spindle 78 as well as between the first and second retainers 64, 66, may be sufficient to guide the movement of the first retainer.

As shown in FIGS. 3 and 4, to control rotation of the first body 52 and hence, the selector 12, the selector may include one or more control features 82 that interact with the blocking member 80 of the first retainer, and the blocking member may more broadly be called a retainer control feature 80. The retainer control feature 80 and selector control features 82 cooperate to inhibit or prevent rotation of the selector 12 in certain positions or the selector and/or in certain operating circumstances.

For example, the first retainer 64 may be positioned to prevent rotation of the first body 52 when the selector 12 is in the position corresponding to the transmission being in park. To shift the transmission out of park, a driver may have to take some action before rotating the selector 12, such as applying a vehicle brake. Upon detection that the vehicle brake has been applied, the actuator 68 may be energized to drive the first retainer 64 to a position in which the retainer control features 80 are not overlapped with the selector control features 82 so that the first body 52 may be rotated relative to the first retainer 64. Similarly, in some instances, such as when a vehicle transmission has been in the neutral gear position for longer than a threshold time, it may be desirable to prevent shifting out of neutral without the driver taking some prerequisite action prior to rotating the selector 12. This is a so-called neutral lock. Such driver action may be applying the brake or pushing a button, for example. Upon detection that the transmission has been in neutral for longer than the threshold time, the actuator 68 may be commanded to move the first retainer 64 to prevent rotation of the first body 52. And upon detection of the prerequisite driver action to shift out of neutral, the actuator 68 may drive the first retainer 64 to a position that permits the first body 52 to be rotated relative to the first retainer 64 so that the selector 12 may be rotated to shift the transmission.

In at least some implementations, the retainer control features 80 and selector control features 82 include opposing surfaces that, when aligned, are axially and radially overlapped so that rotation of the selector 12 is prevented. The control features 80, 82 may include some combination of blocking members and voids, wherein a blocking member may be received at least partially in a void or space defined by control features when it is desired to prevent rotation of the selector. In the example shown, the first retainer 64 includes the blocking member 80, as noted above, and the first body 52 includes multiple voids 82 each selectively aligned with the blocking member 80, as is described further below. Other arrangements may be used including providing the first body 52 with one or more projections or blocking members and the retainer with one or more voids, or some combination of these.

In the example shown, the retainer 64 has a first control feature or blocking member 80 that has oppositely facing surfaces that extend axially and radially (relative to the axis 20 of the first body 52). Other control features may also be provided to interact with different portions of the knob and/or its first body 52, as desired. The first blocking member 80 may be arranged radially outboard of the periphery of the first body 52 in at least some positions of the first retainer 64, and may radially overlap part of the first body 52 in at least one position to prevent rotation of the first body 52. The blocking member 80 may be provided in the same piece of material as the portion of the first retainer 64 engaged with the spindle 78 and the first retainer may thus be defined in a single, unitary body, if desired.

As shown in FIGS. 3 and 4, among others, in more detail, the first body 52 has multiple control features including multiple voids 82, each defined in part by at least one stop surface 92. The voids 82 are circumferentially spaced apart and defined by one or more radially and axially extending surfaces 84. The voids 82 may be defined in the sidewall 60 of the first body 52 and may be open to a radially outer periphery of the first body 52. In the example shown, the first body 52 includes multiple voids 82 evenly circumferentially spaced around the periphery of the first body 52, and a separate one of the voids 82 is arranged to be aligned with the blocking member 80 in each position of the selector 12. When the first blocking member 80 is received at least partially in a void 82 with which it is radially aligned, rotation of the first body 52 is prevented by engagement of the first body 52 with the retainer (e.g. the blocking member 80). Accordingly, the position of the selector 12 can be maintained in any position of the selector by moving the blocking member 80 into the aligned void 82. Of course, other arrangements may be provided as desired.

Any desired number and arrangement of control features may be provided on the retainer 64 and first body 52 to provide desired control of the selector rotation. The control features could also be provided on the knob and the first retainer 64 could interact with the knob as desired, or with another component that moves as the selector 12 is rotated.

Figure 15:
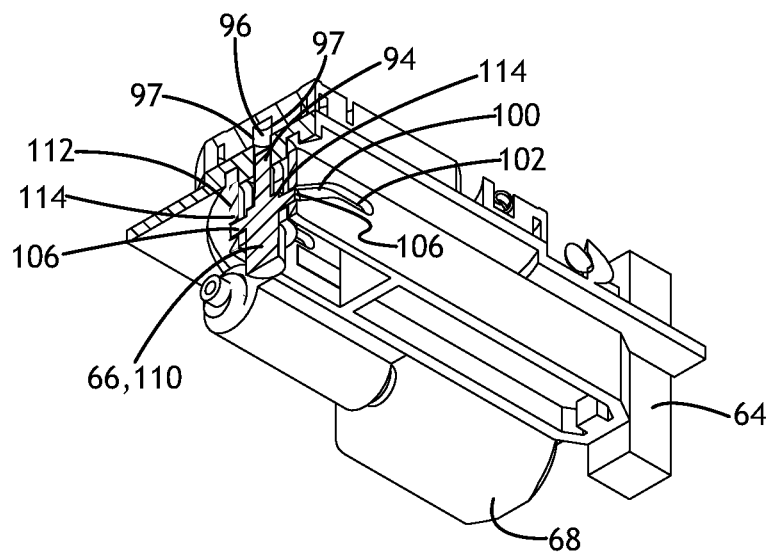
FIG. 15 is a view similar to FIG. 13 showing the retainer in the third position.
Figure 16:
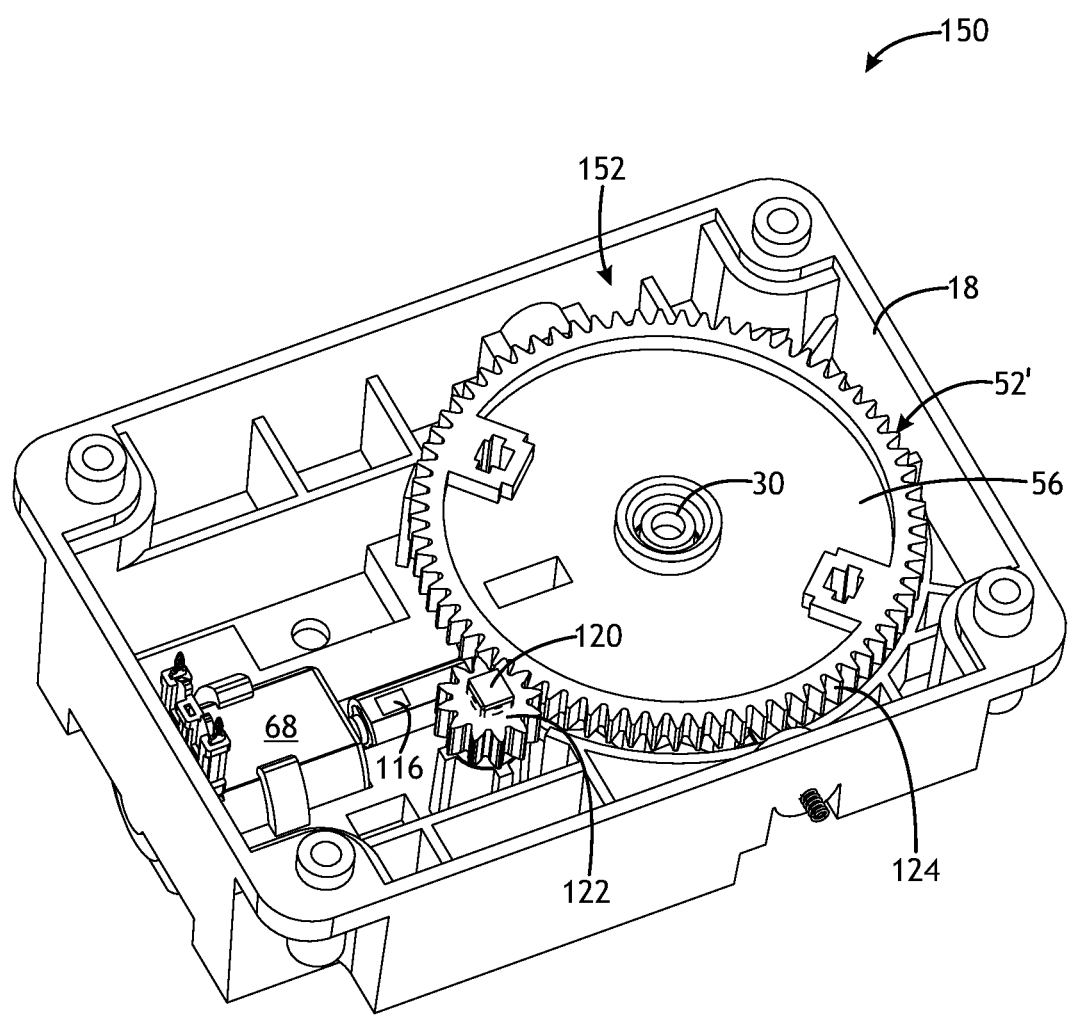
FIG. 16 is a perspective view of a retainer and actuator assembly including an alternate retainer and a portion of a shifter housing.
Figure 17:
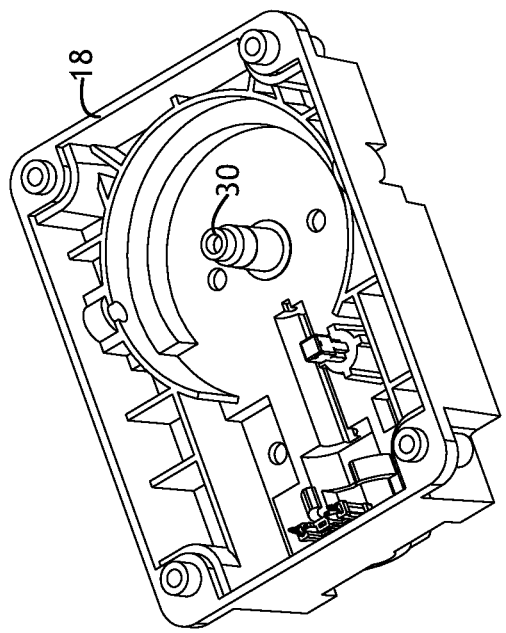
FIG. 17 is an exploded perspective view of the retainer and actuator assembly of FIG. 16.
Figure 17:
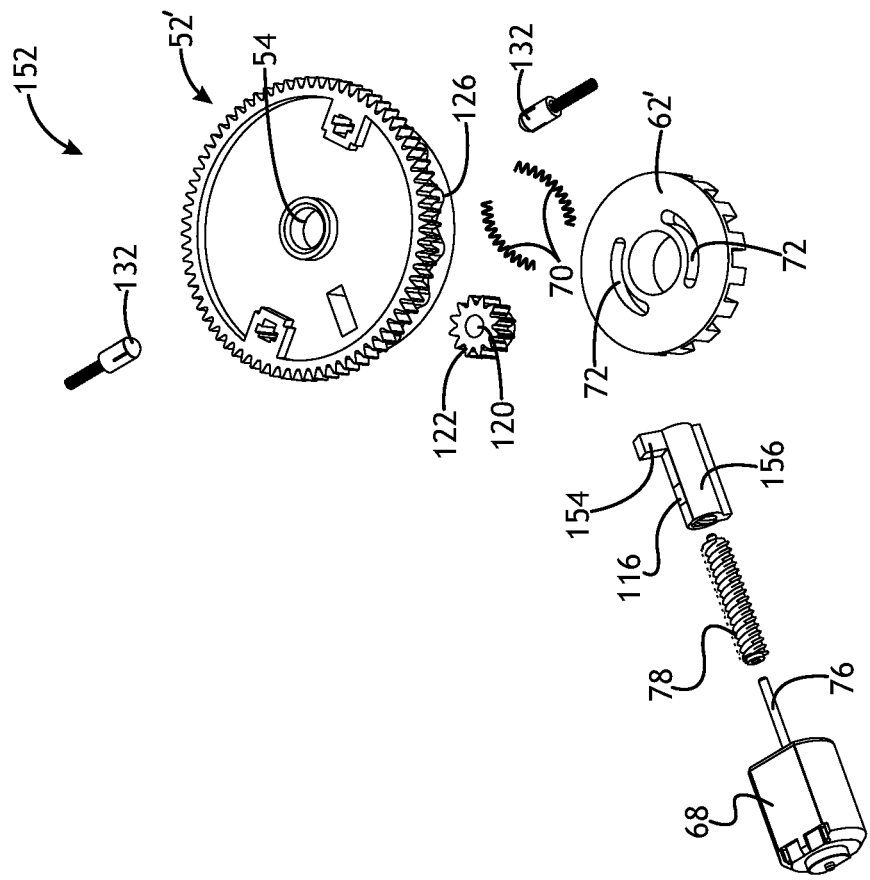
Figure 18:
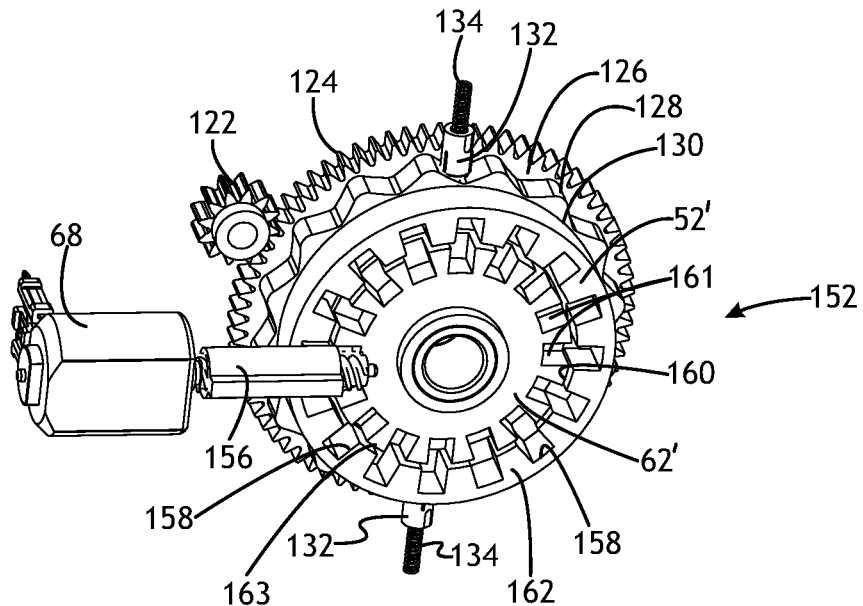
FIG. 18 is a bottom perspective view of the retainer and actuator assembly.

The second retainer 66 may also include a blocking member 94 (FIGS. 4, 13 and 15) which may be an end of the retainer 66 and which may be selectively engaged with or moved in the path of rotation of the second body 62 to selectively prevent rotation of the second body 62. In at least some implementations, the second body 62 includes a plurality of control features 96 that may be selectively engaged with or overlapped by the blocking member 94 or other control feature of the second retainer 66. In the example shown, the second body 62 includes a plurality circumferentially spaced apart and axially facing voids 96 arranged at a common radial distance from the axis 20. The voids 96 may be defined by axially and radially extending surfaces 97 (FIG. 15) and are sized and arranged to be aligned, one at a time, with the blocking member 94 of the second retainer 66. The blocking member 94 may be axially overlapped with the second body 62 in a first position of the second retainer 66 and may be spaced from and not axially overlapped with the second body 62 when the second retainer 66 is in a second position. Of course, the second body 62 could include multiple projections or other control features and the second retainer may include a cavity that cooperates with the control features to selectively prevent rotation of the second body 62.

Figure 11:
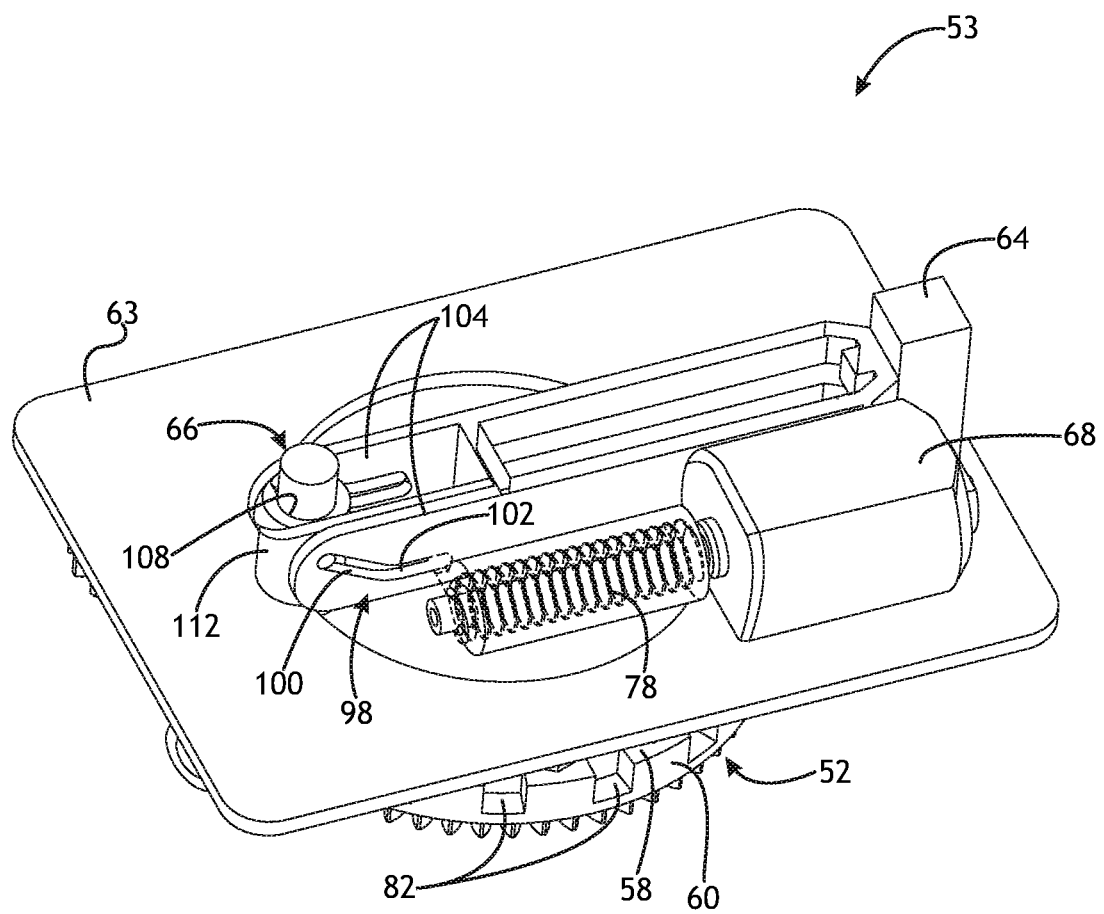
FIG. 11 is a bottom perspective view of the retainer and actuator assembly.

The second retainer 66 may be coupled to the first retainer 64 and driven relative to the second body 62 during at least part of the path of movement of the first retainer 64. In the example shown for example in FIGS. 4 and 11-15, a cam interface 98 is provided between the first and second retainers 64, 66 and includes cam surfaces 100 defined in slots 102 of opposed fingers 104 of the first retainer 64 that receive pins 106 extending from opposite sides of the second retainer 66. The cam surfaces 100 have an axially inclined portion that axially drives the second retainer toward and away from the second body 62, although other arrangements may be used (e.g. including but not limited to a linkage or other arrangement that rotates the second retainer about a pivot so the blocking member moves radially toward and away from the second body 62). In the example shown, the first and second retainers 64, 66 are coupled on the opposite side of the flange 63 as the first and second bodies 52, 62, and the second retainer 66 extends through an opening 108 (FIGS. 11 and 13) in the flange 63 for axial reciprocation relative to the second body 62 and flange. A main body 110 (FIGS. 11 and 13) of the second retainer 66 may be cylindrical, may be received through a cylindrical boss 112 of the flange 63, and the boss 112 may include axially extending slots 114 in which the pins 106 slide as the second retainer 66 is driven axially. The slots 102 may also include a second portion that is not axially inclined such that relative movement between the retainers 64, 66 when the pins 106 are within the second portion does not cause axial displacement of the second retainer 66. This provides a lost motion coupling between the retainers 64, 66 wherein some portion of the movement of the first retainer 64 does not cause any or as much movement of the second retainer 66. In this way, the first retainer 64 may be moved between first and second positions for selective control of the rotation of the first body 52 without actuating the second retainer 66. The first retainer 64 may be moved to a third position and the second retainer 66 may be actuated during at least part of the motion of the first retainer 64 to the third position.

With the first retainer 64 being driven by the actuator 68 and drivingly coupled to the second retainer 66, a single actuator may be used to drive both the first and second retainers. Further, with a lost motion coupling between the first and second retainers 64, 66, the first and second retainers can be selectively driven. Of course, other arrangements may be used, including a second actuator to separately drive the second retainer, as desired.

The shifter 10 may include one or more position sensors to provide a positive indication of the position of one or more components, such as the first retainer 64 and the selector 12. As shown in FIGS. 7-10 (among others), a first sensor element may be coupled to the retainer 64 and is shown as including a magnet 116 received within a cavity of the first retainer 64. A first sensor 118 (FIG. 2) may be carried by the circuit board 26, for example, and may be a hall-effect or other type of sensor responsive to movement of the magnet 116 as the retainer 64 moves. Of course, sensor types other than magnetic may be used, as desired, including but not limited to optical and contact based resistive sensors (e.g. potentiometers). A second sensor element may be carried by the selector 12 or associated with the selector to facilitate a determination of the rotary position of the selector. In the example shown, the second sensor element includes a magnet 120 that is carried by (e.g. fixed to) a gear 122 that is meshed with gear teeth 124 extending radially outwardly from the first body 52. In the example shown, the gear 122 rotates about an axis parallel to but radially offset from the axis 20 of the selector 12, and the gear 122 is rotated any time that the first body 52 rotates. A second sensor 125 (FIG. 2) may be carried by the circuit board 26, for example, and may be a hall-effect or other type of sensor responsive to movement of the second magnet 120 as the gear 122 rotates. Of course, sensor types other than magnetic field sensors may be used, as desired, including but not limited to optical and contact based resistive sensors (e.g. potentiometers). The first and second sensors may be coupled to the controller 28 so that the positions of the retainer 64 and first body 52/selector 12 can be determined during operation of the shifter 10.

In at least some implementations, the shifter 10 may include one or more feedback surfaces 126 arranged to provide a variable resistance to selector rotation. In FIGS. 7-10, the feedback surfaces 126 are defined in the first body 52, more specifically, in the outer surface of the sidewall 60 of the first body 52. The feedback surfaces 126 have circumferentially spaced apart peaks 128 and valleys 130 (labeled in FIGS. 3 and 4 but shown in many figures) at different radial distances from the axis 20. At least when the feedback surfaces 126 are on the first body 52, the peaks 128 may be at a greater distance from the axis 20 than are the valleys 130.

One or more than one follower 132 is arranged to slide along the feedback surfaces 126 during at least some rotation of the selector 12 to provide force feedback to a person rotating the selector. The follower 132 may be yieldably biased, such as by a spring 134 (FIG. 3), into engagement with the first body sidewall 60, or the follower 132 may be flexible and resilient, to permit the follower 132 to remain engaged with the sidewall as the feedback surfaces 126 are rotated past the follower 132. In the example shown, two diametrically opposed followers 132 are carried by the housing (e.g. the base 18) and are biased into engagement with the feedback surface 126. In at least some examples with a spring 134 as the biasing member, the spring is compressed more when the follower 132 is aligned with a peak than when the follower 132 is aligned with a valley, and a greater force is needed to rotate the selector when the follower 132 moves over a peak than when the follower 132 moves into a valley. A resilient follower is itself compressed when aligned with a peak and may resiliently return to or toward an uncompressed state when aligned with a valley. The variation in force needed to rotate the selector 12 that is created by these force feedback surfaces 126 assists the user in finding a desired position, and also in retaining the selector 12 in a selected position as an increased force is needed to remove the follower 132 from a valley 130 (doing so requires more compression of the spring 134 or compression of the follower 132).

In at least some implementations, the valleys 130 may each correspond to a respective one of the various positions of the selector 12 (that is, a first valley corresponds to the park position, a second valley corresponds to the reverse position, a third valley corresponds to the neutral position and a fourth valley corresponds to the drive position). An increased force may be needed to pass the follower 132 over a peak 128 between adjacent valleys 130, and then a spring or other return force acting on or provided by the follower 132 may tend to assist selector rotation toward a valley as the follower 132 rides along an inclined portion of a feedback surface 32 between a peak 128 and valley 130. While described with the feedback surfaces 126 being formed in the first body 52 and the followers 132 being carried by the housing 14, the followers 132 could instead by carried by or fixed to the first body 52 and the feedback surfaces 126 could be provided on the housing or another component.

In normal operation of the selector, the knob 42 may be rotated to change the position of the selector 12 and cause a corresponding shift of the transmission. During this rotation, the second body 62 is held in place by the second retainer and the first body 52 is rotated relative to the second body 62. Rotation of the knob 42 from the park position toward either the reverse, neutral or drive positions, compresses the springs 70 between the first and second bodies 52, 62. Accordingly, the springs 70 provide a force on the first and second bodies 52, 62 at least when the selector 12 is in a position other than the park position.

In at least some instances, it may be desirable to permit the second body 62 to rotate relative to the first body 52, which may be achieved by moving the second retainer 66 and allowing the springs 70 to drive the second body 62 relative to the first body 52. For example, if a vehicle is turned off without first rotating the selector 12 to shift the transmission to park, it may be desirable to automatically shift the vehicle into park. In at least some implementations, this may be done by actuating the shift mechanism 13 (FIG. 1) associated with the transmission 11 which may occur without any associated rotation of the knob 42 or first body 52. Then, so that the selector 12 can be rotated through its full range of positions (i.e. P, R, N and D), the second retainer 66 may be released from the second body 62 and the springs 70 then rotate the second body 62 relative to the first body 52. The first body 52 need not rotate during this position reset, and may be held in place by, for example, the force of the followers 132 engaged with the feedback surfaces 126, and whatever position the first body 52 was in prior to the reset becomes the park position as the springs 70 decompress (or otherwise unload) and rotate the second body 62. In this way, the springs 70 or other member providing a force to rotate the second body 62 may be called an actuator (i.e. a second actuator, and the retainer actuator 68 may be called a first actuator). Of course, instead of shifting the vehicle to park, the system could also cause a transmission shift to neutral, to facilitate towing the vehicle or for other reasons, or to another gear or selector position.

Figure 5:
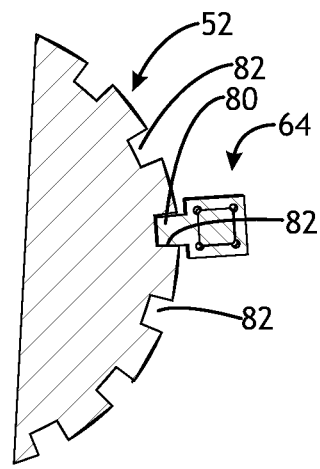
FIG. 5 is a partial sectional view showing a portion of a first body and a portion of a retainer, showing the retainer in a first position preventing rotation of the first body.
Figure 7:
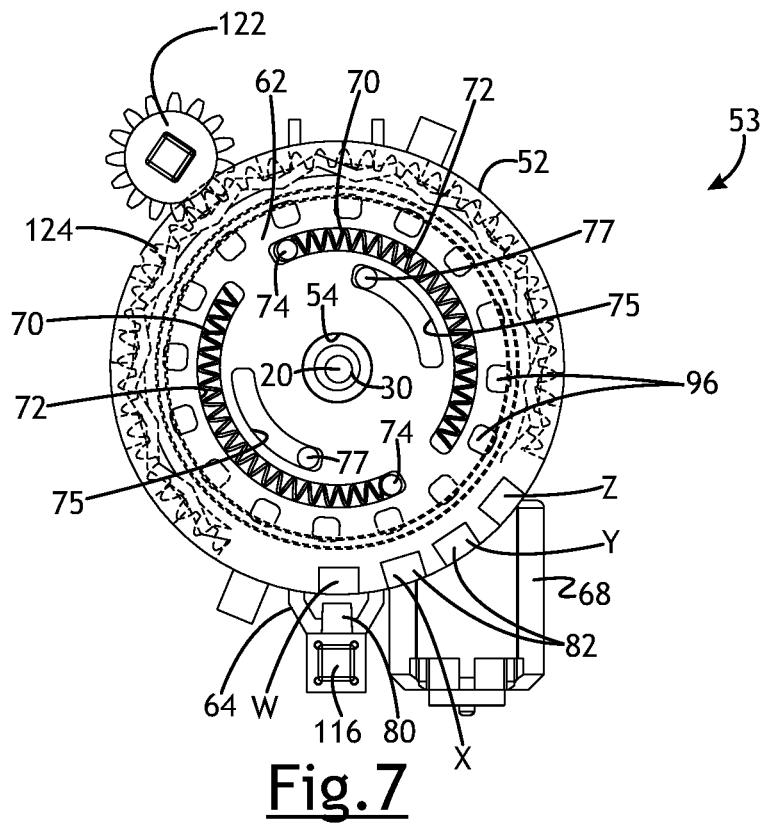
FIG. 7 is a sectional view showing the retainer and actuator assembly when the selector is in a first position corresponding to the transmission being in park, wherein the first body is in a first position, a second body is in a first position and the retainer is in the second position.

The operation of the shifter 10 will now be described. In FIG. 7, the shifter 10 is shown in the first or park position. In this position, the selector 12 is in a first position that corresponds to the transmission being in park, and the first retainer 64 is in a second position in which the retainer 64 permits rotation of the selector 12. The first retainer 64 may be moved to a park lock position as shown in FIG. 5, to prevent rotation of the selector 12 out of the park position, as noted above. In more detail, in the position shown in FIG. 5, the blocking member 80 of the retainer 64 is received in a void 82 of the first body 52. So arranged, rotation of the selector 12 is prevented by engagement of the first body 52 with the blocking member 80.

Figure 6:
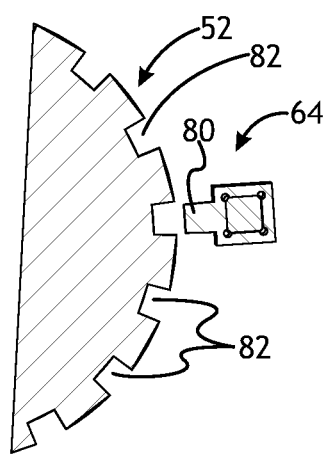
FIG. 6 is a view similar to FIG. 5 showing the retainer in a second position, spaced from the first body.
Figure 12:
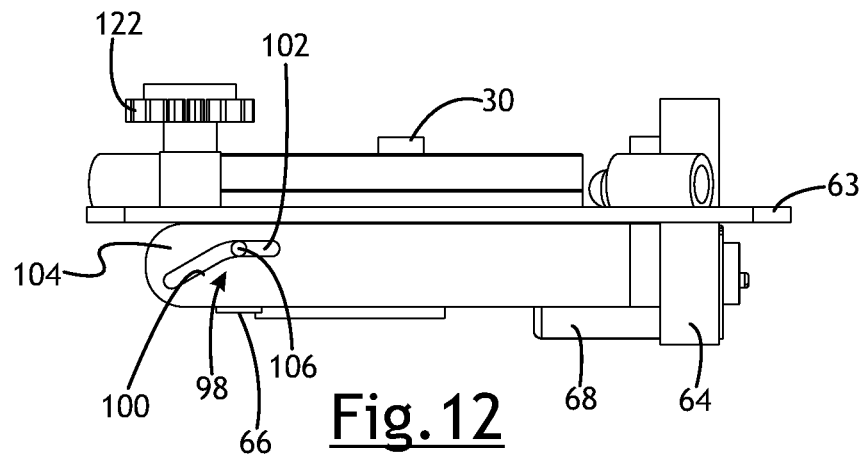
FIG. 12 is a side view of the retainer and actuator assembly showing the retainer in the second position and a blocking member engaged with the second body.
Figure 13:
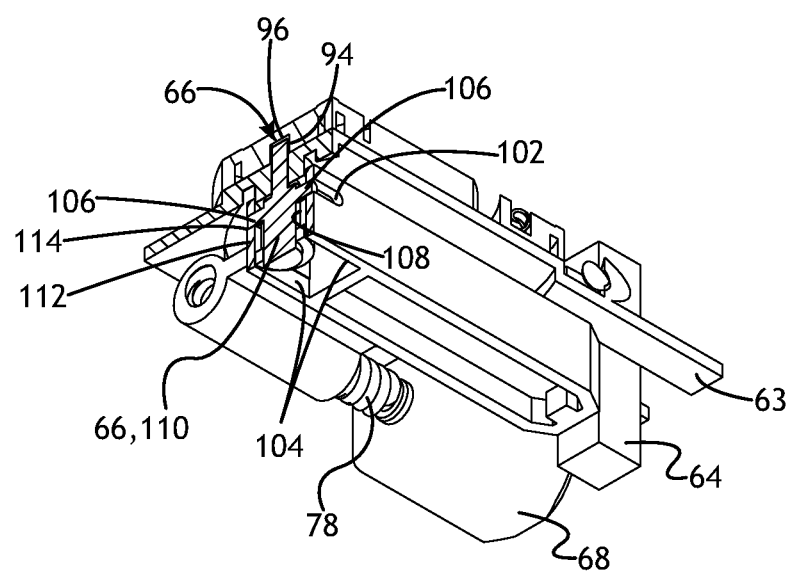
FIG. 13 is a perspective and partial sectioned view of the retainer and actuator assembly.
Figure 14:
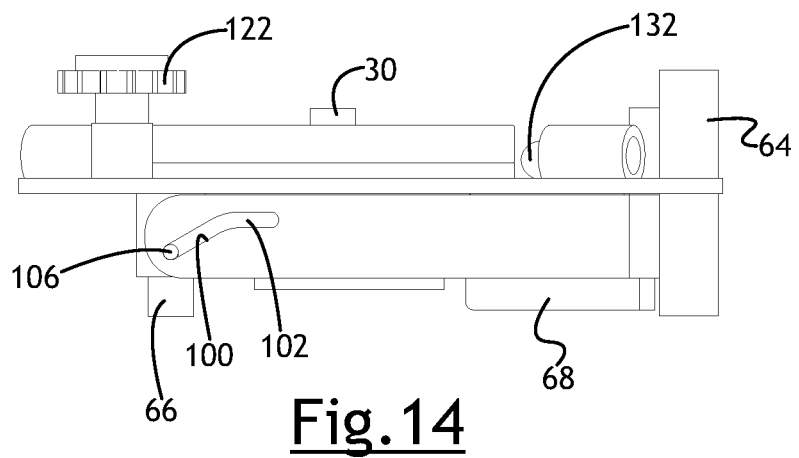
FIG. 14 is a side view of the retainer and actuator assembly showing the retainer in a third position wherein the blocking member is not engaged with the second body.

To permit rotation of the selector 12 out of the park position, the actuator 68 is commanded to move the first retainer 64 away from the first position, to a second position in which the first retainer 64 does not prevent rotation of the selector. That is, the blocking member 80 is moved out of and is radially spaced from the void 82, which can be seen by comparison of FIG. 5 with FIG. 6. In FIG. 6, the first retainer 64 has been driven so that the blocking member 80 is moved radially outwardly (relative to the axis 20) and out of the void 82. Movement of the first retainer 64 to the second position may occur in response to the driver taking some prerequisite action, such as actuating a vehicle brake or otherwise. In this position of the first retainer 64, the selector 12 may be rotated out of the park gear without the retainer 64 interfering or blocking rotation of the first body 52. In at least some implementations, this movement of the first retainer 64 does not engage the cam surface 100 with the pins 106 of the second retainer 66, and the second retainer 66 may remain in its first position, as shown in FIGS. 12 and 13.

Figure 8:
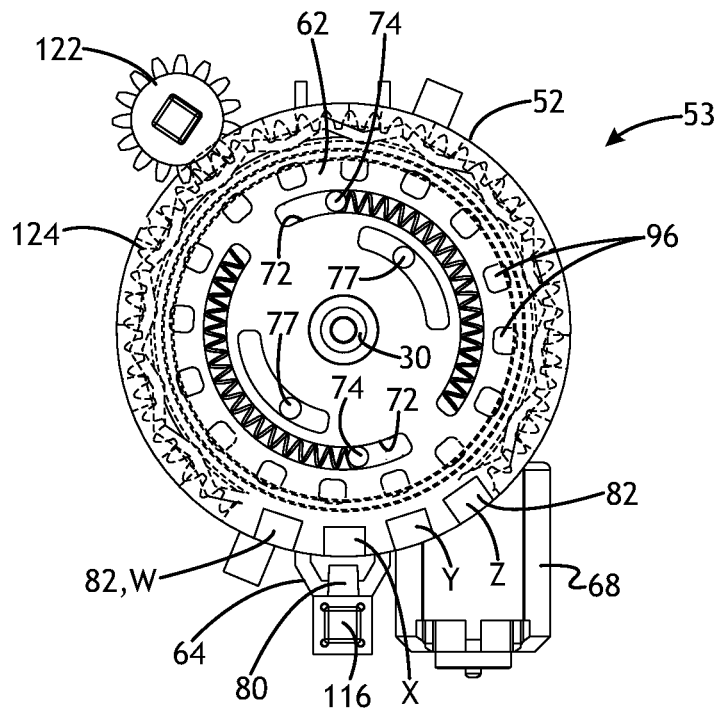
FIG. 8 is a view similar to FIG. 7 showing the selector in a second position corresponding to the transmission being in reverse, with the first body in a second position, the second body in the first position and the retainer in the second position.

FIG. 8 illustrates the selector 12 in the second, or reverse position wherein the first body 52 has been rotated out of the park position. This can be noted by comparison of the void 82 marked with the indicia W which was aligned with the blocking member 80 when the selector was in the park position. In this second position of the selector 12, the blocking member 80 is aligned with a different void (marked as X and which is adjacent to the void W), and positions the followers 132 in the next or adjacent valleys. The first retainer 64 remains in the second position permitting rotation of the first body 52 and selector, and the second retainer 66 remains in its first position preventing rotation of the second body 62. The springs 70 are compressed compared to when the selector is in the park position, by the movement of the pegs 74 in their respective slots 72 in the second body 62.

Figure 9:
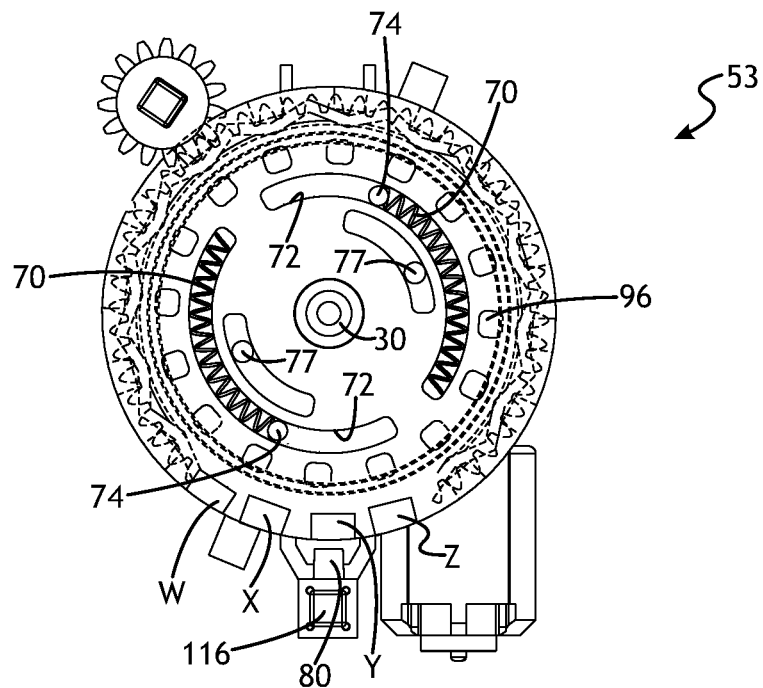
FIG. 9 is a view similar to FIG. 7 showing the selector in a third position corresponding to the transmission being in neutral, with the first body in a third position, the second body in the first position and the retainer in the second position.

FIG. 9 illustrates the selector 12 in the third position, with the follower 132 received in the next valleys 130 (two over from the park position), the blocking member 80 aligned with the void Y, the first retainer 64 in its second position and the second retainer 66 in its first position. The springs 70 are further compressed compared to when the selector was in the second position as can be seen by comparison of FIGS. 8 and 9. In this position of the shifter 10, the vehicle transmission is in neutral and the selector 12 may be rotated from the third position back to the second position or into a fourth position (corresponding to the transmission being in a forward drive gear). In at least some implementations, if one or more criteria are met, the controller 28 will cause the actuator 68 to move the first retainer 64 to its first position (shown in FIG. 5) wherein the first retainer 64 blocks rotation of the selector 12 out of the third position. When the controller 28 actuates the actuator 68, the first retainer 64 is moved from its first position back to its second position so that the blocking member 80 is moved out of the void 82. This may occur, for example, when the driver has actuated the vehicle brake or taken some other prerequisite action.

Figure 10:
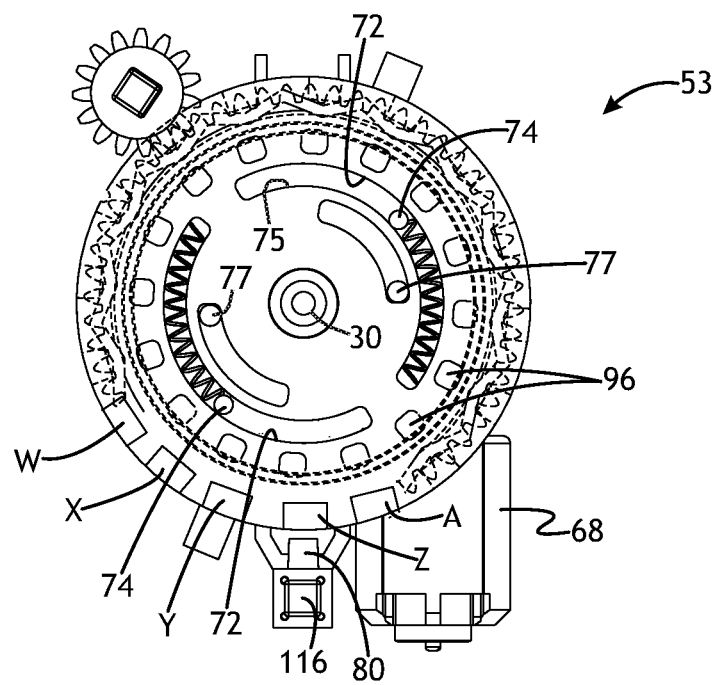
FIG. 10 is a view similar to FIG. 7 showing the selector in a fourth position corresponding to the transmission being in drive, with the first body in a fourth position, the second body in the first position and the retainer in the second position.

After this retainer movement, the selector 12 can be rotated to the fourth position, as shown in FIG. 10, or to the second or first position. In this position of the selector 12, the first retainer 64 is in its second position and the second retainer 66 is in its first position. The springs 70 are further compressed compared to when the selector was in the third position as can be seen by comparison of FIGS. 9 and 10. The blocking member 80 is aligned with a different void 82, marked with an indicia Z for comparison with the previously described voids 82 marked with indicia W, X and Y.

In at least some implementations, when the selector 12 is in a position other than the first position, the selector 12 may be reset to the first position as noted above. To do this in the example shown, the first actuator 68 drives the first retainer 64 to a third position. In the example shown, in the full path of travel of the first retainer, the second position is between the first and third positions, although other arrangements may be used. During movement of the first retainer 64 to its third position, the cam surfaces 100 engage the pins 106 of the second retainer 66 and continued motion of the first retainer 64 in that direction causes the cam surfaces to displace the pins and move the second retainer to its second position. In its second position, the second retainer 66 does not interfere with rotation of the second body 62. In other words, the second blocking member 94 is removed from a void 96 in the second body 62. Then, the springs 70 which act on the second body 62 from within the slots 72, rotate the second body 62 relative to the first body 52. The first body 52 may be held in position by the followers 132 which are received in opposed valleys and thus, resist rotation of the first body 52. In this way, the second body 62 is driven until the springs 70 no longer rotate the second body 62 and the first body 52 is held against rotation.

This now represents the park position of the selector 12. In this new park position, the first blocking member 80 is aligned with the void Z which previously was associated with the drive position of the selector, and the adjacent void bearing the indicia 'A' (FIG. 10) is now associated with the reverse or second position of the selector, and so on. Further, because the second body 62 also was rotated relative to the second retainer 66, the second blocking member 94 is now also aligned with a different void 96 in the second body 62.

With the selector in the park position, the transmission 138 needs to be shifted to match, as until it is shifted, the transmission will be in the gear associated with the position of the selector 12 prior to the resetting movement of the selector. The transmission may be separately shifted to park by electrical command (e.g. from the controller 28) to the shift assembly coupled to the transmission. In this way, the state of the transmission is automatically changed to match the state of the selector. Accordingly, the knob 42 that is manipulated by the user need not be rotated to return the selector to the park position. The force of the followers 132 on the feedback features 126 need not be overcome because the first body does not rotate, there is little to no noise noticeable by an occupant of the vehicle, and the driver is not concerned by the knob rotating without being manipulated by the driver.

Although aligned with different voids, the first retainer 64 and second retainer 66 may function in the same manner in the new, reset position of the selector. The first actuator 68 may drive the retainer 64 to the first position in which the blocking member 80 is received in void Z. During this movement of the first retainer 64, the cam surfaces 100 drive the second retainer 66 back toward the second body 62 and inserts the blocking member 94 into a void 96 in the second body 62 to prevent rotation of the second body 62.

Further, while the first and second retainers 64, 66 are noted as being driven by single actuator, the retainers could be driven by separate actuators, as desired. For example, a solenoid could be used to reciprocate the second retainer between its first and second positions, or a rotary actuator could drive the second retainer. Of course, other arrangements may be used, as desired.

FIGS. 16-25 illustrate a shifter assembly 150 including an alternate actuator and retainer assembly 152. Many of the components are similar to or the same as those previously described and, for ease of description and understanding, will be given the same reference numbers. The following description will focus primarily upon the differences in this shifter assembly and the operation of the assembly.

In this assembly 150, a single retainer control feature (e.g. blocking member 154) may selectively permit or prevent rotation of both the first body 52' and the second body 62'. To do this, the blocking member 154 is carried by a retainer 156 that is moved by an actuator 68 between three positions. In a first position of the retainer 156, the blocking member 154 interacts with a control feature of only the first body 52'. In this position, the first body 52' and selector 12 are prevented from rotating and the second body 62' may rotate relative to the first body 52' under force of a second actuator, such as the springs 70 received in slots 72 in the second body 62' and compressed by a portion of the first body 52' as the first body 52' rotates, or vice versa, as set forth above with regard to the shifter assembly 10. In the second position of the retainer 156, the blocking member 154 interacts with a control feature of only the second body 62'. The second body 62' is therefore held against rotation and the selector 12 may be rotated to cause a transmission gear shift. In a third position of the retainer 156, the blocking member 154 interacts with both a control feature of the second body 62' and a control feature of the first body 52'. Neither the first body 52' nor the second body 62' can be rotated when the retainer in its third position.

To enable the retainer 156 to interact with control features of both the first body 52' and the second body 62', the control features may be aligned and adjacent to each other. Or, the retainer 156 could include two blocking members, with one blocking member arranged to interact with the control feature of the first body 52' and the other blocking member arranged to interact with the control feature of the second body 62'. In the example show, a single blocking member 154 is used and is moved between voids 158, 160, formed in both the first and second bodies 52', 62', respectively.

In more detail, as shown in FIGS. 18-25, the voids 158 in the first body 52' are formed at least partially in the lower surface 162 of the first body 52'. The voids 158 open to a radially inwardly facing edge 160 of a cylindrical cavity 164 in which the second body 62' is received. Correspondingly, the second body 62' has its voids 161 formed opening radially outwardly to a radially peripheral outer edge 163 and aligned with at least some of the voids 158 of the first body 52'. Thus, an open channel is defined at least in part by and between the first and second bodies 52', 62', that is, the aligned and adjacent voids 158, 161 of these bodies.

Figure 19:
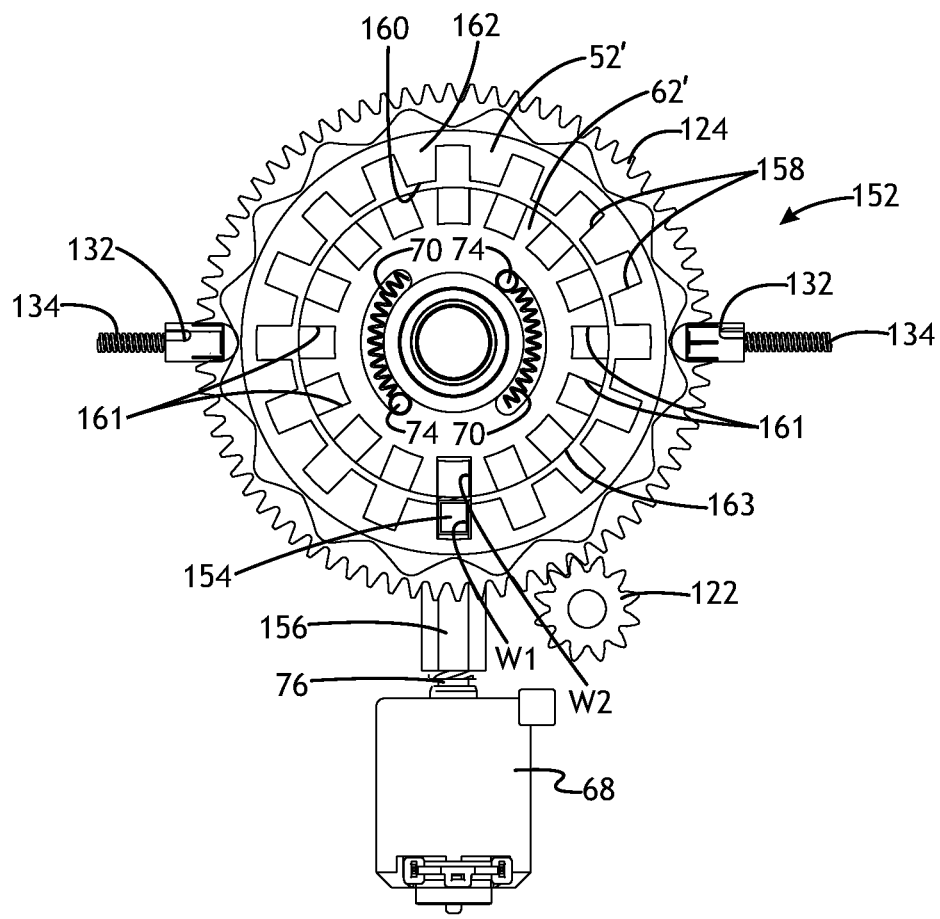
FIG. 19 is a sectional view showing the retainer and actuator assembly when the selector is in a first position corresponding to the transmission being in park, wherein the first body is in a first position, a second body is in a first position and the retainer is in a first position blocking rotation of the first body and selector.

The operation of the shifter assembly 150 will now be described. In FIG. 19, the shifter is shown in the first or park position. In this position, the selector 12 is in a first position that corresponds to the transmission being in park, and the retainer 156 is in a first position in which the retainer 156 is received within a void (marked W1) of the first body 52' to prevent rotation of the selector 12. In this position, the retainer 156 is not received within an aligned void (marked W2) of the second body 62' so the second body 62' could rotate relative to the first body 52'. However, in the illustrated example, the springs 70 are not compressed in this position so there is no force rotating the second body 62'. If a force did exist to rotate the second body 62', the retainer 156 could be moved to its third position shown in FIG. 23 and described above, wherein the retainer 156 prevents rotation of either of the bodies 52', 62'.

Figure 20:
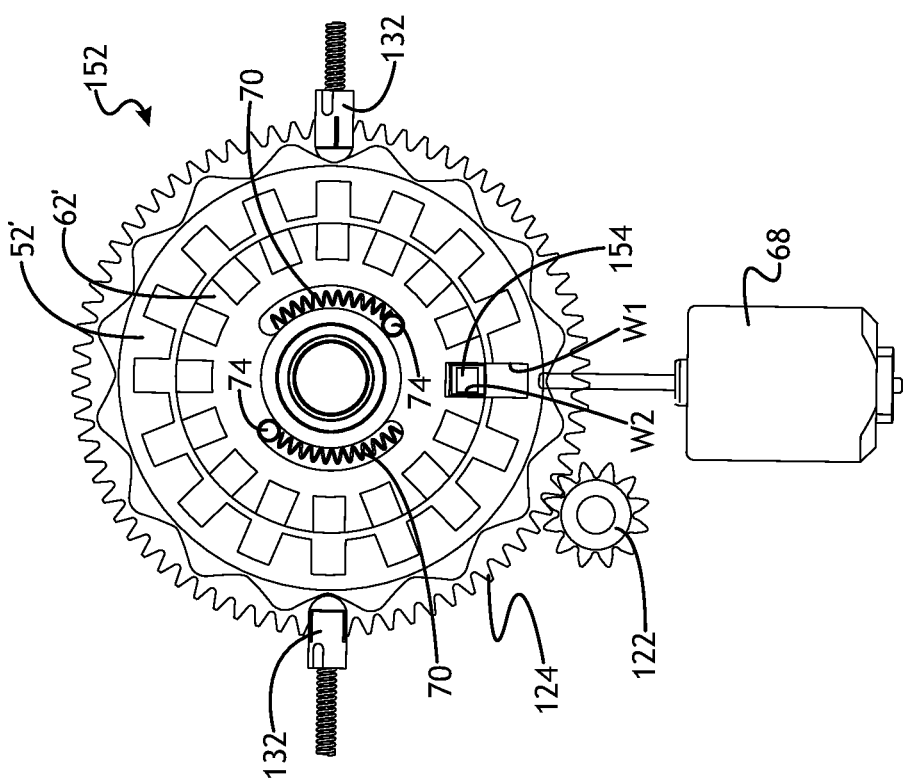
FIG. 20 is a view similar to FIG. 19 showing the selector in the first position, with the first body in the first position, the second body in the first position and the retainer in a second position permitting rotation of the first body and selector.

To permit rotation of the selector 12 out of the park position, the actuator 68 is commanded to move the retainer 156 from the first position to the second position as shown in FIG. 20. In this position, the retainer 156 does not prevent rotation of the selector 12. That is, the blocking member 154 is moved out of and is radially spaced from the void W1 in the first body 52', and is moved into the aligned void W2 in the second body 62'. The first body 52' may subsequently be rotated while the second body 62' is held against rotation. Movement of the retainer 156 to the second position may occur in response to the driver taking some prerequisite action, such as actuating a vehicle brake or otherwise.

Figure 21:
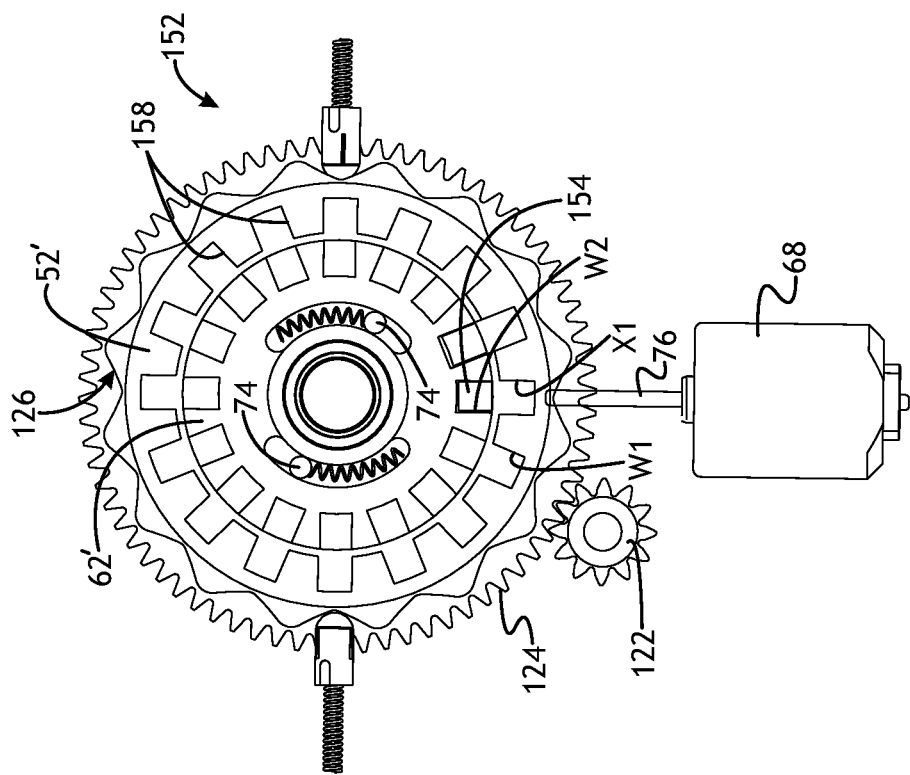
FIG. 21 is a view similar to FIG. 19 showing the selector in a second position corresponding to the transmission being in reverse, with the first body in a second position, the second body in the first position and the retainer in the second position.

FIG. 21 illustrates the selector 12 in the second, or reverse position wherein the first body 52' has been rotated out of the park position. This can be noted by comparison of the void W1 which was aligned with the blocking member 154 when the selector was in the park position. In this second position of the selector, a different void X1 in the first body 52' is aligned with the blocking member 154, but the blocking member is not received within that void X1 and instead remains in the void W2 in the second body 62'. Thus, further rotation of the first body 52' and selector is permitted while rotation of the second body 62' is prevented. The rotation of the first body 52' to the second position compresses the springs 70 between the pegs 74 and second body 62' within the slots 72, as set forth above.

Figure 22:
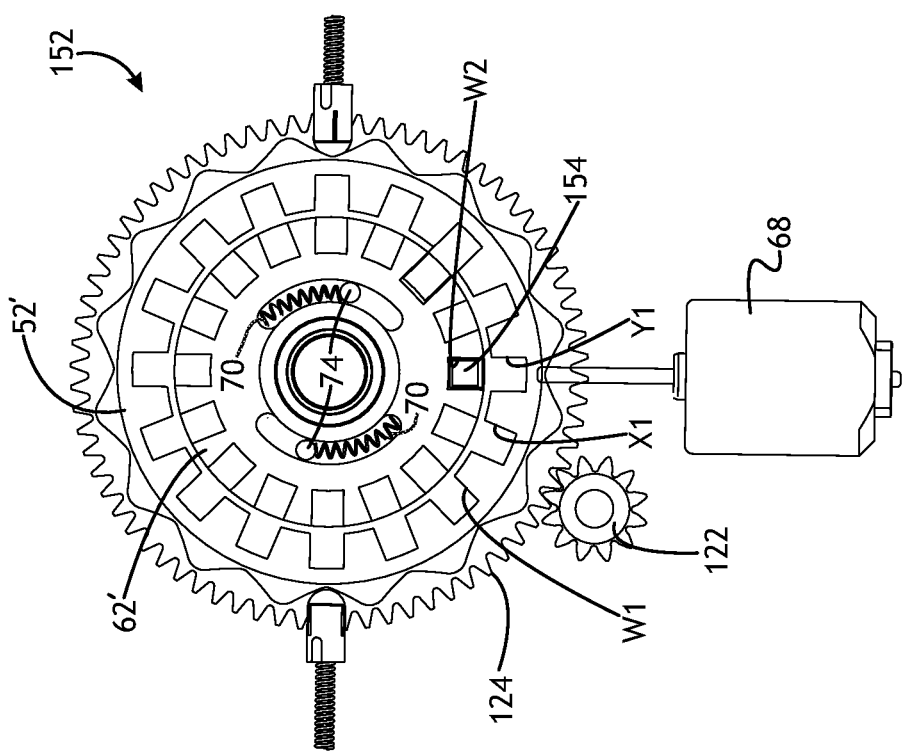
FIG. 22 is a view similar to FIG. 19 showing the selector in a third position corresponding to the transmission being in neutral, with the first body in a third position, the second body in the first position and the retainer in the second position.

FIG. 22 illustrates the selector 12 in the third position, with the retainer 156 still in its second position. The springs 70 are further compressed compared to when the selector was in the second position as can be seen by comparison of FIGS. 21 and 22. In this position of the shifter 10, the vehicle transmission is in neutral and the selector 12 may be rotated from the third position back to the second position or into a fourth position (corresponding to the transmission being in a forward drive gear).

Figure 23:
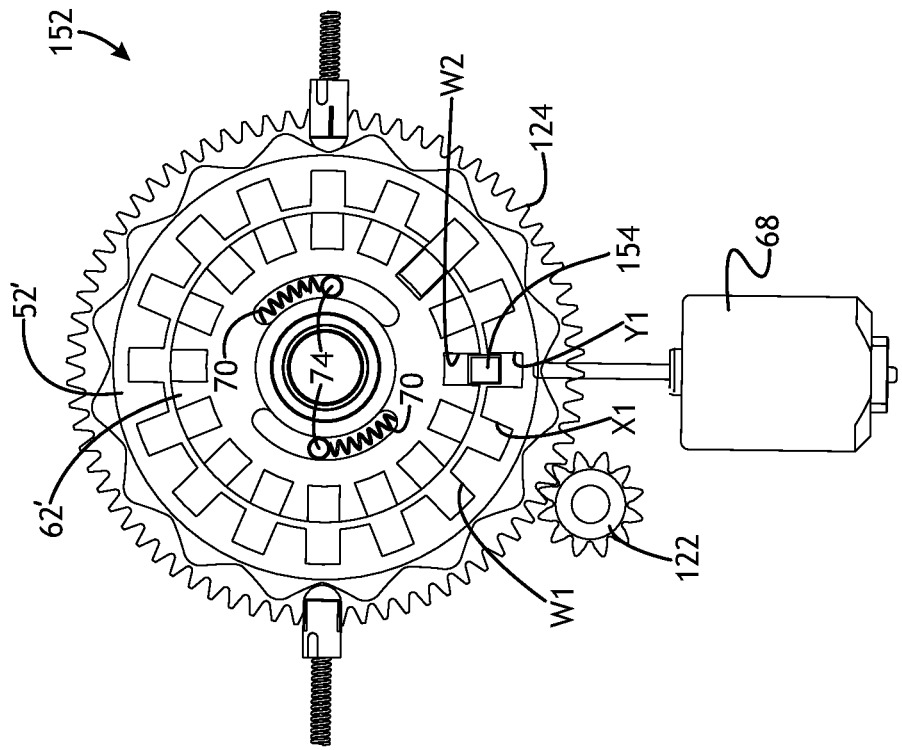
FIG. 23 is a view similar to FIG. 19 showing the selector in the third position corresponding to the transmission being in neutral, with the first body in the third position, the second body in the first position and the retainer in a third position preventing rotation of both the first and second bodies.

In at least some implementations, if one or more criteria are met, the controller 28 will cause the actuator 68 to move the retainer 156 to its third position, shown in FIG. 23. In this position, the blocking member 154 is received partially in both the void Y1 of the first body 52 and void W2 of the second body 62. In this position, the retainer 156 blocks rotation of the selector 12 out of the third position and also prevents rotation of the second body 62' to maintain the compression of the springs 70 and the relative rotary orientation of the first and second bodies 52', 62'. When the controller 28 actuates the actuator 68, the first retainer 156 is moved from its third position back to its second position (as in FIG. 22) so that the blocking member 154 no longer blocks rotation of the first body 52' but still blocks rotation of the second body 62'. This may occur, for example, when the driver has actuated the vehicle brake or taken some other prerequisite action.

Figure 24:
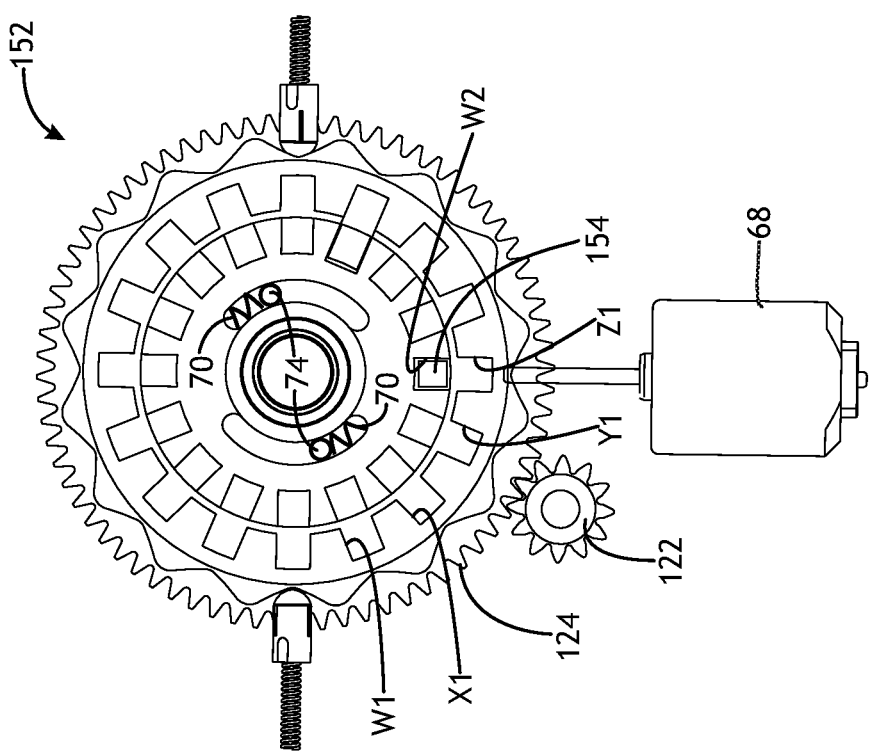
FIG. 24 is a view similar to FIG. 19 showing the selector in a fourth position corresponding to the transmission being in drive, with the first body in a fourth position, the second body in the first position and the retainer in the second position.

After this retainer movement, the selector 12 can be rotated to the fourth position, as shown in FIG. 24, or to the second or first position. In this position of the selector, the springs 70 are further compressed compared to when the selector was in the third position as can be seen by comparison of FIGS. 23 and 24. The blocking member 154 is aligned with a different void Z1 in the first body 52'.

In at least some implementations, when the selector 12 is in a position other than the first position, the selector 12 may be reset to the first position as noted above. To do this in the example shown, the first actuator 68 drives the retainer 156 to the first position wherein the blocking member 154 only interacts with the first body 52' and does not interact with the second body 62'. In other words, the blocking member 154 is removed from the void W2 in the second body 62' and moved into void Z1 in the first body 52'. Then, the springs 70 which act on the second body 62' from within the slots 72, rotate the second body 62' relative to the first body 52', which can be seen by the change in position of void W2. The first body 52' is held in position by the retainer 156. In this way, the second body 62' is driven until the springs 70 no longer rotate the second body 62' and the first body 52' is held against rotation.

Figure 25:
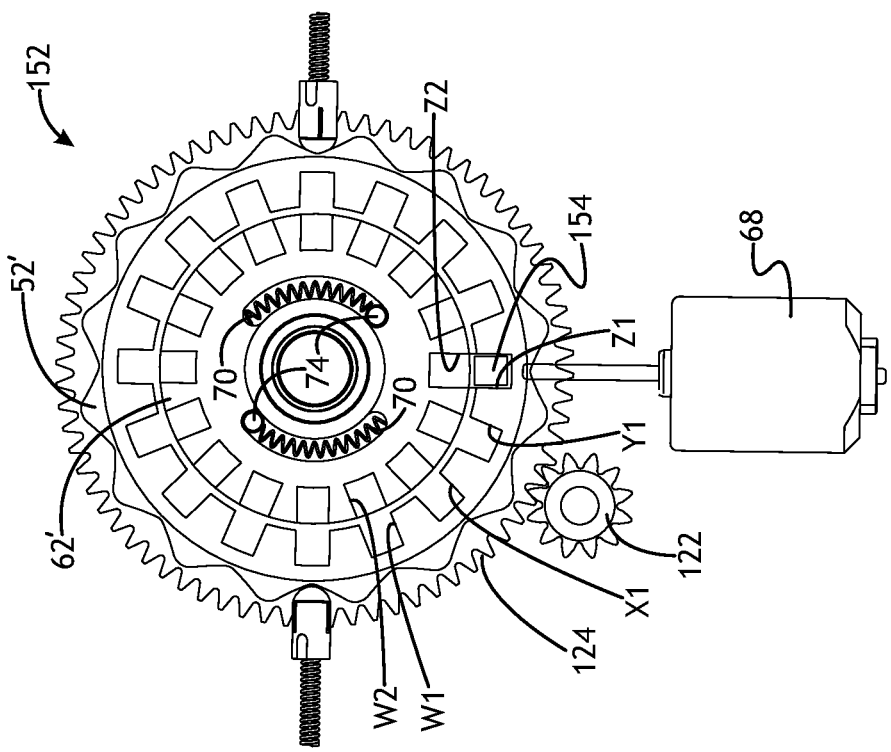
FIG. 25 is a view similar to FIG. 19 in that the selector, first body, second body and retainer are in the same relative positions, but the first body and second body have rotated relative to their positions in FIG. 19 establishing new first positions of these bodies.

This now represents the park position of the selector 12. In this new park position, as shown in FIG. 25, the blocking member 154 is aligned with and may be received in the void Z1 which previously was associated with the drive position of the selector but now represents the park position, as set forth above with regard to the assembly 10. Further, because the second body 62' also was rotated relative to the retainer 156, the blocking member 154 is now also aligned with a different void Z2 (FIG. 25) in the second body 62'.

Accordingly, a retainer may be moved by an actuator among multiple positions to control rotation of first and second bodies. A second actuator may rotate the second body in at least certain circumstances to change the effective position of the second body relative to the first body. In at least some implementations, the second body may be received in multiple different positions to reset the second body to a first position so that the shift assembly is in a position corresponding to the transmission being in park. The transmission can, in turn, be shifted to park independently of the rotation of the second body, as controlled by a suitable controller and/or control system. This reset motion within the shifter assembly may occur without any human intervention and automatically in response to one or more conditions.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A shifter for a vehicle transmission, comprising:
a first body rotatable among multiple positions;
a second body rotatable among multiple positions;
a retainer movable relative to the second body between a first position in which the retainer prevents rotation of the second body, and a second position in which the retainer permits rotation of the second body;
a first actuator coupled to the retainer to move the retainer between the first and second positions; and
a second actuator providing a force on the second body to rotate the second body when the retainer is in the second position,
wherein the second actuator is a biasing member having a first part engaged with the first body and a second part engaged with the second body so that rotation of the first body relative to the second body in one direction increases a force of the biasing member, and wherein one of the first body and the second body includes a void and the other of the first body and the second body includes a projection received within the void, and wherein the biasing member is received within the void and is engaged by the projection.

2. The shifter of claim 1 wherein the retainer is movable relative to the first body and when the retainer is in the second position, the retainer prevents rotation of the first body.

3. The shifter of claim 2 wherein the retainer is movable to a third position wherein the retainer prevents rotation of both the first body and the second body.

4. The shifter of claim 1 which also includes a retainer associated with and selectively engageable with the first body to selectively prevent rotation of the first body and wherein the first actuator drives both the retainer associated with the first body and the retainer that prevents rotation of the second body.

5. The shifter of claim 4 wherein the retainer associated with the first body is driven by the first actuator and the retainer that prevents rotation of the second body is driven by the retainer associated with the first body.

6. The shifter of claim 5 wherein a lost motion coupling is provided between the retainer that prevents rotation of the second body and the retainer associated with the first body.

7. The shifter of claim 1 which also includes feedback surfaces and a follower engaged with the feedback surfaces, wherein one of the feedback surfaces or the follower is carried by the first body to provide a variable resistance to rotation of the first body.

8. The shifter of claim 1 wherein one of the first body and the second body includes a void and the other of the first body and the second body includes a projection received within the void, and wherein relative rotation between the first body and the second body is limited in at least one direction by engagement of the projection with the body that defines the void.

9. A shifter for a vehicle transmission, comprising:
a selector rotatable among multiple positions to shift the transmission, the selector includes a first body;
a second body rotatable among multiple positions and rotatable relative to the first body, the second body having multiple control features;
a retainer being movable relative to the second body between a first position and a second position, the retainer including a control feature that interacts with at least one control feature of the second body so that, when the retainer is in the first position, rotation of the second body is prevented, and when the retainer is in the first position the second body may rotate;
a first actuator coupled to the retainer to move the retainer between the first and second positions; and
a second actuator providing a force on the second body to rotate the second body when the retainer is in the second position,
wherein the second actuator is a biasing member having a first part engaged with the first body and a second part engaged with the second body so that rotation of the first body relative to the second body in one direction increases a force of the biasing member, and wherein one of the first body and the second body includes a void and the other of the first body and the second body includes a projection received within the void, and wherein the biasing member is received within the void and is engaged by the projection.

10. The shifter of claim 9 wherein the retainer is selectively engageable with the first body and when the retainer is in the second position, the retainer prevents rotation of the first body.

11. The shifter of claim 10 wherein the retainer is movable to a third position wherein the retainer prevents rotation of both the first body and the second body.

12. The shifter of claim 10 wherein the first body includes multiple voids, the second body includes multiple voids and the retainer when in the third position is received at least partially in one of the voids of the first body and one of the voids of the second body.

13. The shifter of claim 9 which also includes a retainer associated with and selectively engageable with the first body to selectively prevent rotation of the first body and wherein the first actuator drives both the retainer associated with the first body and the retainer that prevents rotation of the second body.

14. The shifter of claim 9 which also includes feedback surfaces and a follower engaged with the feedback surfaces, wherein one of the feedback surfaces or the follower is carried by the first body to provide a variable resistance to rotation of the first body.

15. The shifter of claim 9 wherein one of the first body and the second body includes a void and the other of the first body and the second body includes a projection received within the void, and wherein relative rotation between the first body and the second body is limited in at least one direction by engagement of the projection with the body that defines the void.

16. A shifter for a vehicle transmission, comprising:
a selector rotatable among multiple positions to shift the transmission, the selector includes a first body;
a second body rotatable among multiple positions and rotatable relative to the first body, the second body having multiple control features;
a retainer being movable relative to the second body between a first position and a second position, the retainer including a control feature that interacts with at least one control feature of the second body so that, when the retainer is in the first position, rotation of the second body is prevented, and when the retainer is in the first position the second body may rotate;
a first actuator coupled to the retainer to move the retainer between the first and second positions;
a second actuator providing a force on the second body to rotate the second body when the retainer is in the second position; and
a retainer associated with and selectively engageable with the first body to selectively prevent rotation of the first body and wherein the first actuator drives both the retainer associated with the first body and the retainer that prevents rotation of the second body,
wherein the retainer associated with the first body is driven by the first actuator and includes a cam that engages and drives the retainer that selectively prevents rotation of the second body.

\* \* \* \* \*